US011945690B2

(12) United States Patent
Kwon et al.

(10) Patent No.: US 11,945,690 B2
(45) Date of Patent: *Apr. 2, 2024

(54) ELEVATOR COMPENSATION ASSEMBLY MONITOR

(71) Applicant: OTIS ELEVATOR COMPANY, Farmington, CT (US)

(72) Inventors: Yisug Kwon, Farmington, CT (US); Randy Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,796

(22) Filed: Oct. 28, 2022

(65) Prior Publication Data

US 2023/0052952 A1 Feb. 16, 2023

Related U.S. Application Data

(63) Continuation of application No. 16/855,230, filed on Apr. 22, 2020, now Pat. No. 11,524,872.

(51) Int. Cl.

| | |
|---|---|
| ***B66B 7/06*** | (2006.01) |
| ***B66B 1/04*** | (2006.01) |
| ***B66B 1/34*** | (2006.01) |
| ***B66B 5/00*** | (2006.01) |
| ***B66B 7/04*** | (2006.01) |
| ***B66B 7/10*** | (2006.01) |

(52) U.S. Cl.

CPC ................ *B66B 7/068* (2013.01); *B66B 1/04* (2013.01); *B66B 1/3492* (2013.01); *B66B 5/0025* (2013.01); *B66B 7/048* (2013.01); *B66B 7/10* (2013.01)

(58) Field of Classification Search

CPC ......... B66B 7/068; B66B 1/04; B66B 1/3492; B66B 5/0025; B66B 7/048; B66B 7/10

See application file for complete search history.

(56) References Cited

U.S. PATENT DOCUMENTS 2,537,075 A * 1/1951 Margles .................. B66B 7/068 187/266

4,230,205 A * 10/1980 Darwent ................ B66B 7/068 187/265

(Continued)

FOREIGN PATENT DOCUMENTS

EP 2636628 A1 11/2013

EP 3070043 A1 9/2016

(Continued)

*Primary Examiner* — Michael A Riegelman

(74) *Attorney, Agent, or Firm* — Carlson, Gaskey & Olds, P.C.

(57) ABSTRACT

An illustrative example embodiment of an elevator compensation assembly includes a tie down mechanism and at least one compensation sheave that has an outer surface configured to engage at least one compensation rope member. At least one damper is associated with the tie down mechanism for resisting vertical movement of the tie down mechanism in at least one direction. At least one detector directly detects vertical movement of the tie down mechanism along the direction and provides an output indicating at least one characteristic of the detected vertical movement.

23 Claims, 3 Drawing Sheets

(56) References Cited

U.S. PATENT DOCUMENTS

| | | | | | |
|---|---|---|---|---|---|
| 4,522,285 | A * | 6/1985 | Salmon | B66B 7/068 254/277 |
| 5,277,276 | A * | 1/1994 | Pramanik | B66B 7/068 187/411 |
| 5,788,018 | A * | 8/1998 | Mendelsohn | B66B 11/08 187/404 |
| 5,861,084 | A * | 1/1999 | Barker | B66B 7/06 187/414 |
| 6,193,017 | B1 * | 2/2001 | Koster | B66B 11/007 187/256 |
| 6,431,321 | B2 * | 8/2002 | Ach | B66B 7/10 187/412 |
| 7,946,390 | B2 * | 5/2011 | McNamara | B66B 7/10 187/412 |
| 8,123,002 | B2 * | 2/2012 | Smith | B66B 7/068 187/266 |
| 8,763,763 | B2 * | 7/2014 | Kawakami | B66B 5/044 187/247 |
| 9,359,172 | B2 * | 6/2016 | Mangini | B66B 7/06 |
| 9,409,749 | B2 * | 8/2016 | Kalliomäki | B66B 7/068 |
| 9,856,114 | B2 * | 1/2018 | Lampinen | B66B 7/068 |
| 9,868,614 | B2 * | 1/2018 | Smith | B66B 9/00 |
| 9,963,324 | B2 * | 5/2018 | Virta | B66B 7/02 |
| 10,118,808 | B2 * | 11/2018 | Sunderhaus | B66D 1/58 |
| 11,524,872 | B2 * | 12/2022 | Kwon | B66B 7/10 |
| 2005/0133312 | A1 * | 6/2005 | Kaczmarek | B66B 7/068 187/412 |
| 2013/0118840 | A1 * | 5/2013 | Kalliomaki | B66B 7/10 187/265 |
| 2016/0115002 | A1 * | 4/2016 | Sunderhaus | B66D 5/02 254/272 |
| 2016/0244298 | A1 * | 8/2016 | Roberts | B66B 9/00 |
| 2017/0022030 | A1 * | 1/2017 | Bai | B66B 7/068 |
| 2018/0050884 | A1 * | 2/2018 | Shen | B66B 7/068 |
| 2018/0093866 | A1 * | 4/2018 | Weibel | B66B 11/08 |
| 2018/0237265 | A1 * | 8/2018 | Fargo | B66B 7/062 |
| 2021/0221645 | A1 * | 7/2021 | Kwon | B66B 9/00 |
| 2021/0331896 | A1 * | 10/2021 | Kwon | B66B 7/068 |
| 2021/0339983 | A1 * | 11/2021 | Ilvonen | B66B 5/0056 |

FOREIGN PATENT DOCUMENTS

| | | | |
|---|---|---|---|
| EP | 3263504 | A1 | 1/2018 |
| JP | H0753156 | A | 2/1995 |
| JP | 07315717 | A | 12/1995 |
| WO | 2011055020 | A1 | 5/2011 |
| WO | 2017006146 | A1 | 1/2017 |
| WO | 2018211165 | A1 | 11/2018 |

* cited by examiner

ELEVATOR COMPENSATION ASSEMBLY MONITOR

CROSS REFERENCE TO RELATED APPLICATION

This application is a continuation of U.S. patent application Ser. No. 16/855,230, filed on Apr. 22, 2020.

BACKGROUND

Elevator systems are useful for carrying passengers and items between different levels of a building. Many elevator systems are traction-based and include traction ropes that suspend the elevator car and a counterweight. A machine causes movement of a traction sheave that, in turn, causes movement of the traction ropes for moving the elevator car as desired. One feature of traction-based elevator systems is a compensation assembly including compensation rope suspended beneath the car and counterweight and a tie down mechanism near the bottom of the hoistway. The compensation assembly is useful to prevent counterweight jump, which might otherwise occur during an engagement of the elevator safeties. The compensation assembly also facilitates maintaining appropriate tension on the traction ropes to achieve desired traction and appropriate tension on the compensation ropes to ensure they properly stay engaged in the tie down mechanism.

Certain conditions may develop over time that interfere with or compromise the ability of the compensation assembly to consistently provide the desired performance. For example, a hydraulic system that produces a damping effect to prevent the tie down mechanism from oscillating or vibrating may be prone to air infiltration over time. Air in such a system reduces the damping effect. Time-consuming, manual inspection procedures are typically needed to diagnose such problems with a compensation assembly.

SUMMARY

An illustrative example embodiment of an elevator compensation assembly includes a tie down mechanism with at least one compensation sheave that has an outer surface configured to engage at least one compensation rope member. At least one damper is associated with the tie down mechanism for resisting vertical movement of the tie down mechanism in at least one direction. At least one detector directly detects vertical movement of the tie down mechanism along the direction and provides an output indicating at least one characteristic of the detected vertical movement.

In an embodiment having at least one feature of the assembly of the previous paragraph, the at least one detector comprises an accelerometer that provides an indication of acceleration of the tie down mechanism during the detected movement and the output indicates at least an amplitude of the acceleration.

In an embodiment having at least one feature of the assembly of any of the previous paragraphs, the at least one detector comprises a processor that receives the indication from the accelerometer, the processor determines if the detected movement satisfies a first criterion, and the output includes an indication based on the detected movement satisfying the first criterion.

In an embodiment having at least one feature of the assembly of any of the previous paragraphs, the first criterion comprises a threshold amplitude of the detected movement and the output corresponds to an alert when the amplitude of the detected movement exceeds the threshold amplitude.

In an embodiment having at least one feature of the assembly of any of the previous paragraphs, the output indicates a frequency of the detected movement, the first criterion includes a threshold frequency, and the output corresponds to the alert when the frequency of the detected movement exceeds the threshold frequency.

In an embodiment having at least one feature of the assembly of any of the previous paragraphs, the processor determines if the detected movement satisfies a second criterion and the output includes an indication based on the detected movement satisfying the second criterion.

In an embodiment having at least one feature of the assembly of any of the previous paragraphs, the second criterion comprises a trend in the detected movement over time and the output includes an indication of a potential future need for maintenance when the detected movement satisfies the second criterion.

In an embodiment having at least one feature of the assembly of any of the previous paragraphs, the at least one damper comprises two hydraulic cylinders, the at least one detector comprises two detectors, one of the detectors is associated with each of the hydraulic cylinders, and the outputs of the detectors collectively indicate a symmetry between the hydraulic cylinders.

In an embodiment having at least one feature of the assembly of any of the previous paragraphs, the at least one damper comprises a hydraulic fluid within a cylinder and the output indicates whether gas is present within the cylinder.

In an embodiment having at least one feature of the assembly of any of the previous paragraphs, the at least one damper is associated with a hydraulic circuit, the hydraulic circuit includes a reservoir and at least one conduit between the cylinder and the reservoir, and the output indicates whether gas is present in the hydraulic circuit.

An illustrative example embodiment of a method of monitoring an elevator compensation assemblies includes detecting movement of a tie down mechanism along a direction using at least one detector associated with the tie down mechanism and generating an output indicating at least one characteristic of the detected movement.

In an embodiment having at least one feature of the method of the previous paragraph, the at least one detector comprises an accelerometer. Detecting the movement comprises detecting an acceleration of the tie down mechanism and the output indicates at least an amplitude of the acceleration.

In an embodiment having at least one feature of the method of any of the previous paragraphs, the method includes determining if the detected movement satisfies a first criterion and wherein the output includes an indication based on the detected movement satisfying the first criterion.

In an embodiment having at least one feature of the method of any of the previous paragraphs, the first criterion comprises a threshold amplitude of the detected movement and the output corresponds to an alert when the amplitude of the detected movement exceeds the threshold amplitude.

In an embodiment having at least one feature of the method of any of the previous paragraphs, the output indicates a frequency of the detected movement, the first criterion includes a threshold frequency, and the output corresponds to the alert when the frequency of the detected movement exceeds the threshold frequency.

In an embodiment having at least one feature of the method of any of the previous paragraphs, the method includes determining if the detected movement satisfies a second criterion and wherein the output includes an indication based on the detected movement satisfying the second criterion.

In an embodiment having at least one feature of the method of any of the previous paragraphs, the second criterion comprises a trend in the detected movement over time, and the output includes an indication of a potential future need for maintenance when the detected movement satisfies the second criterion.

In an embodiment having at least one feature of the method of any of the previous paragraphs, the at least one damper comprises two hydraulic cylinders, the at least one detector comprises two detectors, one of the detectors is associated with each of the hydraulic cylinders, and outputs of the detectors collectively indicate a symmetry between the hydraulic cylinders.

In an embodiment having at least one feature of the method of any of the previous paragraphs, the at least one damper comprises a hydraulic fluid within a cylinder, and the method comprises determining whether gas is present within the cylinder based on the detected movement.

In an embodiment having at least one feature of the method of any of the previous paragraphs, the cylinder is associated with a hydraulic circuit, the hydraulic circuit includes a reservoir and at least one conduit between the cylinder and the reservoir, and the method comprises determining whether air is present in the hydraulic circuit based on the detected movement.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention facilitate automatically monitoring an elevator compensation assembly. Example embodiments include at least one detector that provides information regarding movement of a tie down mechanism. The information regarding such movement is useful to determine whether dampers, such as hydraulic cylinders, are properly functioning. For example, the information from the detector is useful to determine whether air is present in a hydraulic circuit or hydraulic cylinder of a hydraulic damper.

Figure 1:
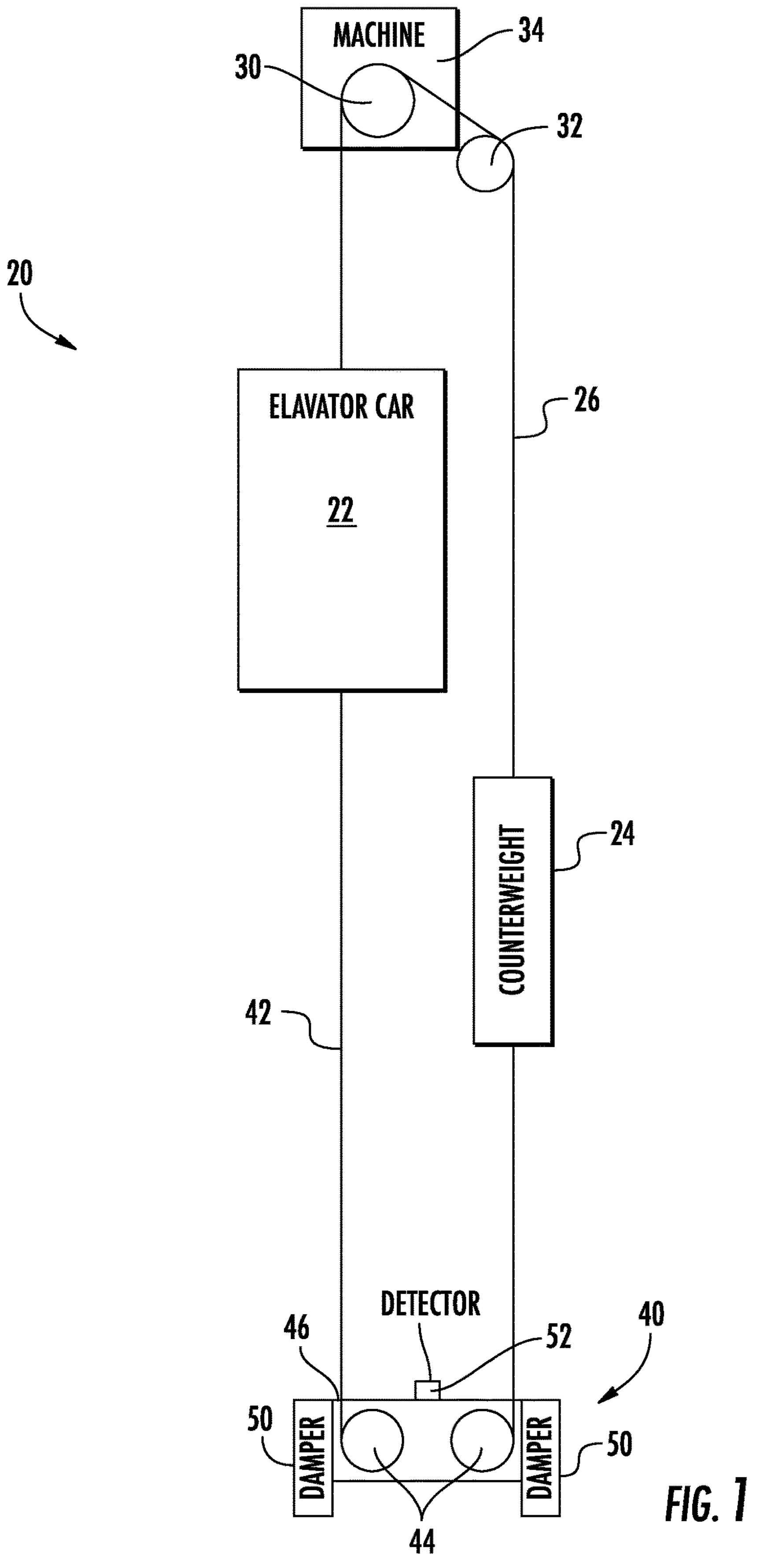
FIG. 1 schematically illustrates selected portions of an example embodiment of an elevator system.

FIG. 1 schematically illustrates selected portions of an elevator system 20. An elevator car 22 is coupled to a counterweight 24 by traction ropes 26. Although not shown in detail, the traction ropes 26 include a plurality of tension members, such as round ropes or flat belts. The traction ropes 26 follow a path defined, at least in part, by sheaves 30 and 32. The sheave 30 is a traction sheave associated with a machine 34 that selectively causes movement of the traction ropes 26 to control the movement and position of the elevator car 22 for providing elevator service to passengers.

The elevator system 20 includes a compensation assembly 40 that includes compensation rope members 42 suspended beneath the elevator car 22 and counterweight 24. The compensation rope members 42 follow a path defined, at least in part, by compensation sheaves 44, which are part of a tie down mechanism 46. The tie down mechanism 46 maintains adequate tension on the compensation rope members 42 to ensure that the compensation rope members 42 stay engaged and aligned within the compensation assembly 40.

Dampers 50 are associated with the tie down mechanism 46 to allow for controlled, limited movement of the compensation sheaves 44 and the tie down mechanism 46. The dampers 50 may take various forms depending on the particular elevator system configuration. In the illustrated example embodiment, the dampers 50 include hydraulic cylinders that expand or contract in response to forces on the compensation rope members 42. The dampers 50 will be referred to as hydraulic cylinders in the rest of this description. The hydraulic cylinders 50 resist movement of the tie down mechanism 46 and prevent it from oscillating or vibrating to maintain adequate tension on the compensation rope members 42 and the traction ropes 26, for example, and to keep the compensation rope members 42 in corresponding grooves (not illustrated) on the compensation sheaves 44.

At least one detector 52 detects movement of the tie down mechanism 46. The detector 52 in this example embodiment includes an accelerometer and a processor and provides an output corresponding to detected acceleration of the tie down mechanism 46. Other movement detectors are used in some embodiments. For example, some detectors 52 include a set of switches that are arranged so that timing and movement information can be determined based on switch activation. Other embodiments include hall effect sensors situated to interact with corresponding features on the tie down mechanism 46 or the dampers 50 to detect movement. Other embodiments include optical or vision-based sensors or proximity and movement sensors such as ultrasound, RADAR or LIDAR detectors.

The detector 52 is shown as a single item or component in the illustration for discussion purposes, but it need not be entirely located at the site of the compensation assembly 40. For example, in some embodiments, a portion of the detector 52 including the accelerometer is situated on the tie down mechanism 46 while the processor is at another location in the elevator system 20 or remotely located. The processor may be a dedicated computing device or a portion of a computing device that performs other elevator system monitoring or analysis functions.

The movement of the tie down mechanism 46 detected by the detector 52 will have different characteristics, such as frequency and amplitude, depending on the condition of the compensation assembly 40. The characteristics of the detected movement are therefore useful for diagnosing a condition of the compensation assembly 40.

Figure 2:
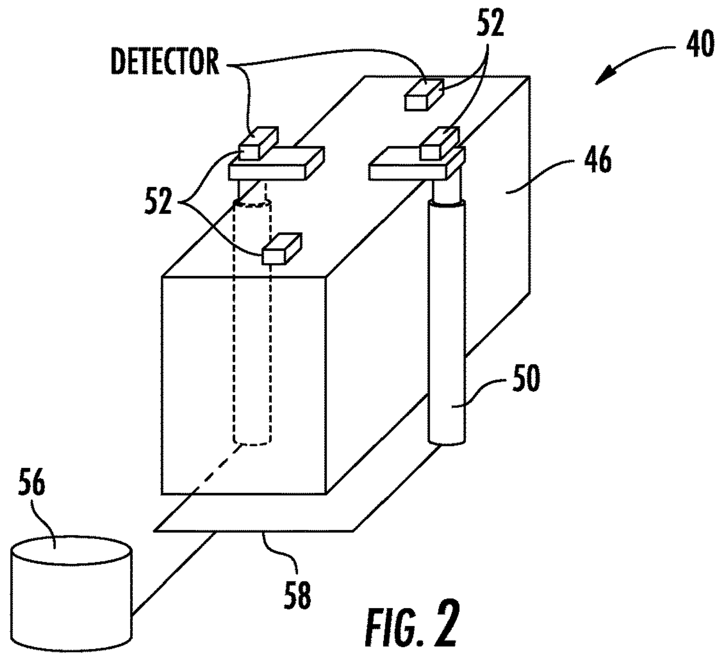
FIG. 2 schematically illustrates selected portions of an example embodiment of a compensation assembly.

FIG. 2 schematically illustrates selected portions of an example compensation assembly 40. In this example, the hydraulic cylinders 50 resist or dampen movement of the tie down mechanism 46 along a vertical axis. The hydraulic cylinders 50 are connected with a hydraulic circuit including a reservoir 56 and conduits 58 that carry hydraulic fluid between the hydraulic cylinders 50 and the reservoir 56.

The example embodiment of FIG. 2 includes multiple detectors 52. One of the detectors 52 is associated with each of the hydraulic cylinders 50 and situated above the respective cylinder. With such an arrangement of detectors 52 it is possible to monitor the movement or performance of each hydraulic cylinder 50 and to determine whether the hydraulic cylinders 50 are functioning in a symmetrical manner or if there are performance differences between them. Additional detectors 52 are situated near the ends of the tie down mechanism 46 to provide additional movement information when that is needed or of interest.

Figure 3A:
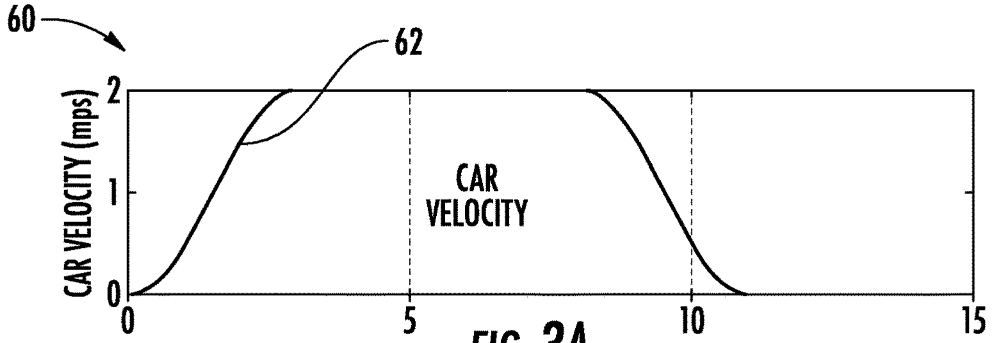
FIGS. 3A-3C graphically illustrate elevator car velocity, acceptable tie down mechanism movement and undesirable tie down mechanism movement, respectively.
Figure 3B:
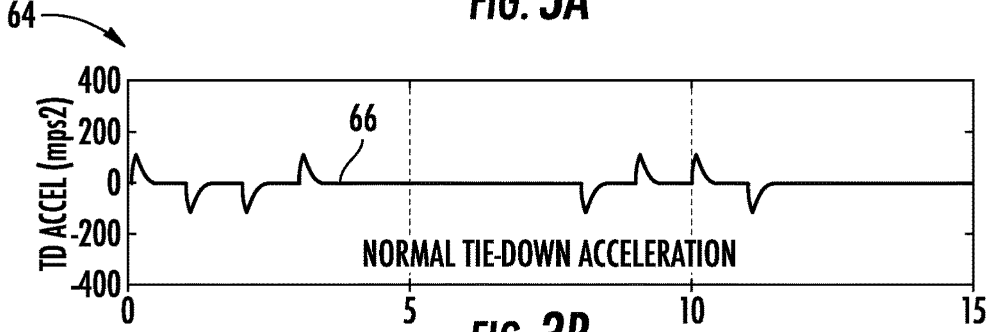

FIG. 3A is a graphical plot 60 of an elevator car velocity profile shown at 62. During a typical run, the elevator car 22 begins from a stop at a landing, accelerates until it reaches a desired travel speed, and then decelerates as car 22 approaches and reaches the destination landing. During the acceleration and deceleration of the elevator car, it is normal or expected that the compensation assembly 40, and the tie down mechanism in particular, to experience some movement. FIG. 3B shows a normal or expected amount of movement of the tie down mechanism 46 at 64. The illustrated acceleration profile 66 represents the acceleration of the tie down mechanism 46 during the elevator run represented in FIG. 3A. As can be appreciated from FIG. 3B, the tie down mechanism acceleration profile 66 includes several peaks (positive and negative) as the tie down mechanism is pulled upward by the forces associated with the change in the elevator car velocity and urged back downward by the hydraulic cylinders 50. When the hydraulic cylinders 50 are functioning as desired, the number of peaks or frequency of the profile 66 will be below a threshold that can be empirically determined for a particular elevator system configuration. The amplitude of the peaks in the profile 66 will also be below a threshold value when the hydraulic cylinders 50 are properly functioning.

When the hydraulic cylinders 50 are not able to dampen movement of the tie down mechanism 46 sufficiently or as desired, the tie down mechanism 46 will move in a different manner than that which is represented by the acceleration shown in FIG. 3B. When, for example, there is air in the hydraulic cylinders 50, the hydraulic cylinders 50 will not be able to dampen movement of the tie down mechanism 46 in an expected or ideal manner Instead, the tie down mechanism 46 will move more as represented by the plot 68 in FIG. 3C. The profile 70 shows the type of acceleration that the tie down mechanism 46 could experience during the same elevator run represented in FIG. 3A if the hydraulic cylinders 50 are not functioning properly. It is also possible for air to be present in the reservoir 56 or the conduits 58 and that will also negatively affect the performance of the hydraulic cylinders 50.

Figure 3C:
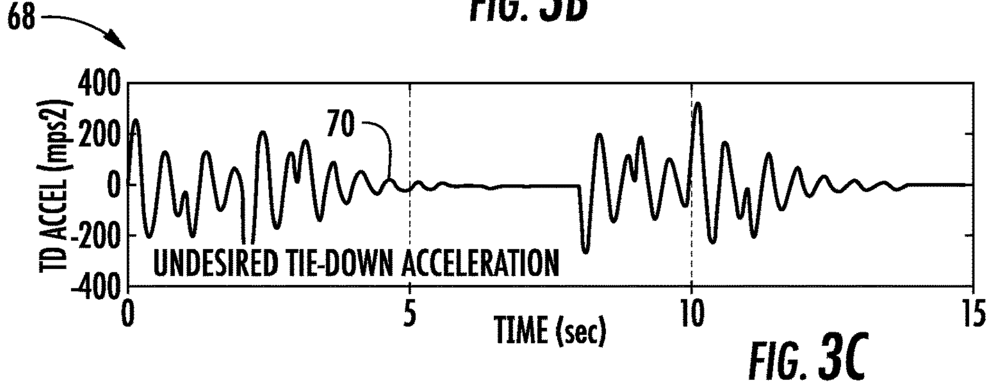

The profile 70 includes a significantly larger number of peaks compared to the number of peaks on the profile 66 in FIG. 3B. The amplitude of at least some of the peaks in the profile 70 are also larger than the peaks in the profile 66. The amplitude of the peaks in FIG. 3C are also much more variable compared to the relatively consistent amplitudes shown in FIG. 3B.

The detector 52 provides an output that corresponds to the detected movement of the tie down mechanism 46. The processor of the detector 52 or another processor in communication with the detector 52 determines whether the output indicates that the hydraulic cylinders 50 need maintenance or service. For example, the output from the detector 52 provides an indication whether the hydraulic cylinders 50 or another part of the hydraulic circuit includes air.

Figure 4:
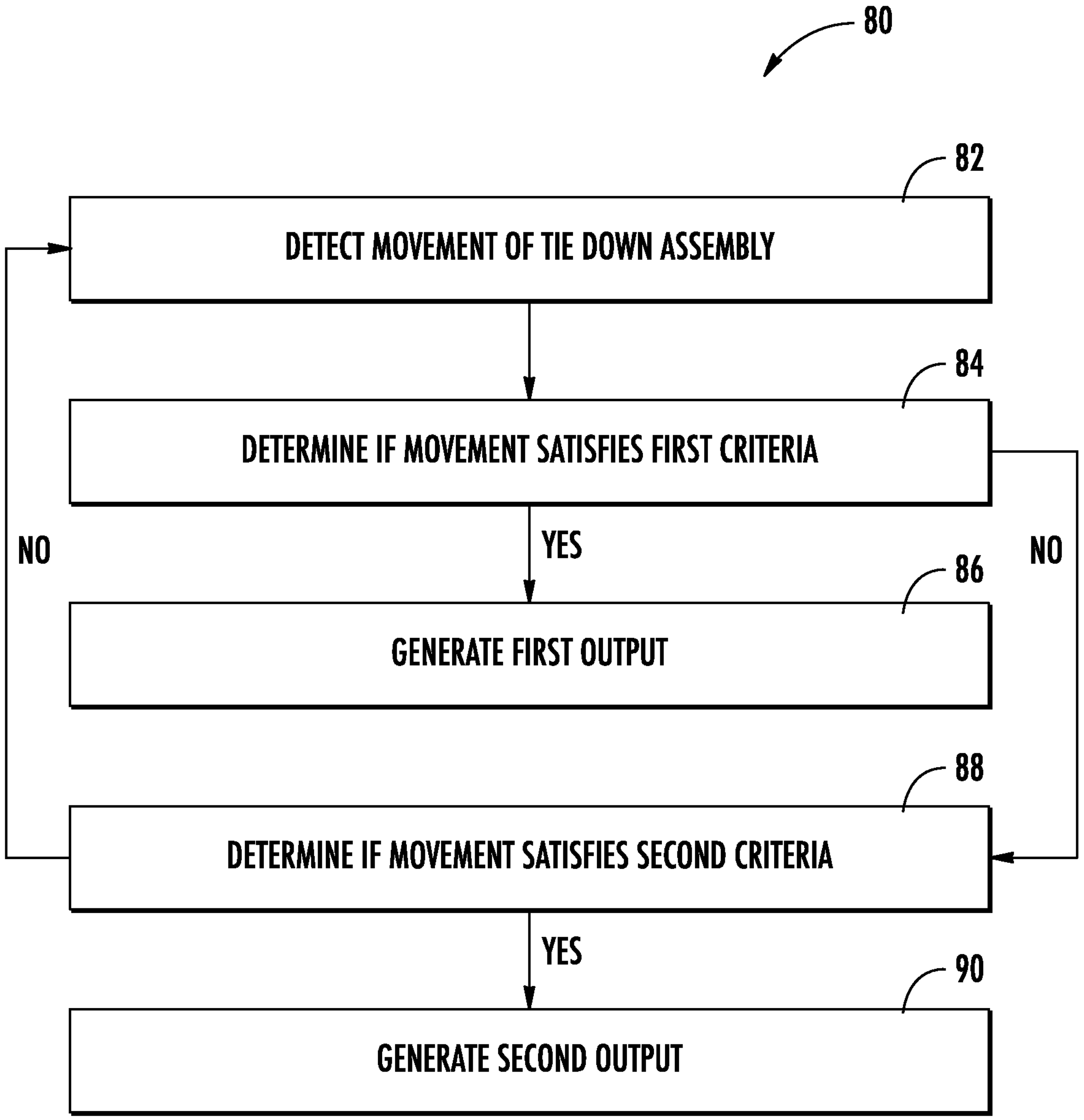
FIG. 4 is a flow chart diagram summarizing an example compensation assembly monitoring method.

FIG. 4 is a flow chart diagram 80 that summarizes an example method of monitoring the compensation assembly 40 to determine a condition of the hydraulic cylinders 50. At 82, movement of the tie down mechanism 46 is detected by the detector 52. At 84, the detected movement is compared to at least one first criterion. In this example, there are several first criteria, such as the number of peaks in the detected acceleration, the amplitude of any peaks in the detected acceleration, a variance in the amplitude of the peaks, and a frequency of the peaks. If the detected movement satisfies any one of the first criteria, then a first output is generated or provided at 86.

In the illustrated example embodiment, the first criteria include several first thresholds corresponding to the characteristic of the detected movement. For example, the first criteria include a threshold acceleration amplitude, a threshold number of peaks and a threshold frequency. In this embodiment if any of those thresholds are exceeded by the corresponding characteristic of the detected movement, the detector 52 provides the first output at 86. In some embodiments, a combination of thresholds must be exceeded, such as a number of peaks that exceed the threshold amplitude, to trigger the first output at 86.

In some embodiments, the first output is an alert or alarm indicating that the compensation assembly 40 needs immediate service or repair because the tie down mechanism 46 is moving significantly more than desired. Such movement may be the result of significant sway of the compensation rope members 42. It is desirable to detect such movement and to address the situation to protect the compensation rope members 42 from becoming entangled with each other or otherwise damaged.

In FIG. 4, even if none of the first criteria is satisfied, a determination is made at 88 whether second criteria are satisfied by the detected movement. In this example, the second criteria correspond to or are based on low pass filtering. Some movement of the tie down mechanism 46 is expected and even unexpected movement may not indicate any problem within certain limits. Using a low pass filter approach facilitates recognizing when the movement of the tie down mechanism 46 is significant enough to contribute to a need to service or repair the compensation assembly 40.

The second criteria in this embodiment do not indicate an immediate need to provide maintenance or service the hydraulic cylinders 50 but, instead, provide an ongoing monitoring function that shows a trend of movement of the tie down mechanism 46 indicating a future need to inspect or service the compensation assembly 40. For example, the second criteria includes second thresholds that are lower than the first thresholds of the first criteria. When the detected movement has at least one characteristic that exceeds the corresponding second threshold, the detector 52 generates a second output at 90. The second output may be a maintenance reminder or a counter increment that contributes to reaching a predetermined count that eventually results in a maintenance reminder.

In embodiments like that shown in FIG. 2, the detected movement indicated by the detector 52 and the resulting output provide information that indicates the presence of air in the hydraulic circuit including the hydraulic cylinders 50. For such arrangements, the first or second output corresponds to or contributes to a determination that there is air in the hydraulic fluid preventing the hydraulic cylinders 50 from sufficiently damping movement of the tie down mechanism to maintain an acceleration profile like the profile 66 of FIG. 3B. Other determinations can be made regarding different types of hydraulic cylinders 50 or other components of the compensation assembly 40 based on movement detected by the detector(s) 52.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator compensation assembly, comprising:

a tie down mechanism including at least one compensation sheave having an outer surface configured to engage at least one compensation rope member;

at least one damper associated with the tie down mechanism for resisting vertical movement of the tie down mechanism in at least one direction; and at least one detector that detects vertical movement of the tie down mechanism along the at least one direction and provides an output indicating at least one characteristic of detected vertical movement.

2. The elevator compensation assembly of claim 1, wherein the at least one detector comprises one or more accelerometers associated with the tie down mechanism to indicate acceleration of the tie down mechanism during the detected vertical movement, and the output indicates at least an amplitude of the acceleration.

3. The elevator compensation assembly of claim 2, wherein the at least one detector comprises a processor that receives the indication from the accelerometer, the processor determines if the detected vertical movement satisfies a first criterion, and the output includes an indication based on the detected vertical movement satisfying the first criterion.

4. The elevator compensation assembly of claim 3, wherein the first criterion comprises a threshold amplitude of the detected vertical movement, and the output corresponds to an alert when the amplitude of the detected vertical movement exceeds the threshold amplitude.

5. The elevator compensation assembly of claim 4, wherein the output indicates a frequency of the detected vertical movement, the first criterion includes a threshold frequency, and the output corresponds to the alert when the frequency of the detected vertical movement exceeds the threshold frequency.

6. The elevator compensation assembly of claim 3, wherein the processor determines if the detected vertical movement satisfies a second criterion, and the output includes an indication based on the detected vertical movement satisfying the second criterion.

7. The elevator compensation assembly of claim 6, wherein the second criterion comprises a trend in the detected vertical movement over time, and the output includes an indication of a potential future need for maintenance when the detected vertical movement satisfies the second criterion.

8. The elevator compensation assembly of claim 1, wherein the at least one damper comprises two hydraulic cylinders associated with the tie down mechanism, the at least one detector comprises two detectors, one of the detectors is associated with each of the hydraulic cylinders, and the outputs of the detectors collectively indicate a symmetry between the hydraulic cylinders.

9. The elevator compensation assembly of claim 1, wherein the at least one damper is associated with the tie down mechanism and comprises a hydraulic fluid within a cylinder, and the output indicates whether gas is present within the cylinder.

10. The elevator compensation assembly of claim 9, wherein the at least one damper is associated with a hydraulic circuit, the hydraulic circuit includes a reservoir and at least one conduit between the cylinder and the reservoir, and the output indicates whether gas is present in the hydraulic circuit.

11. The elevator compensation assembly of claim 1, wherein a portion of the at least one detector is situated on the tie down mechanism or on the at least one damper.

12. The elevator compensation assembly of claim 11 wherein the at least one detector comprises a plurality of detectors including at least a first detector on the tie down mechanism and a second detector on the at least one damper.

13. A method of monitoring an elevator compensation assembly that includes a tie down mechanism having at least one compensation sheave and at least one damper associated with the tie down mechanism for resisting vertical movement of the tie down mechanism in at least one direction, the method comprising:

detecting vertical movement of the tie down mechanism along the at least one direction using at least one detector associated with the tie down mechanism, and generating an output indicating at least one characteristic of detected vertical movement.

14. The method of claim 13, wherein the at least one detector comprises an accelerometer, detecting the vertical movement comprises detecting an acceleration of the tie down mechanism, and the output indicates at least an amplitude of the acceleration.

15. The method of claim 13, comprising providing a portion of the at least one detector on the tie down mechanism or on the at least one damper, and determining if the detected vertical movement satisfies a first criterion and wherein the output includes an indication based on the detected vertical movement satisfying the first criterion.

16. The method of claim 15, wherein the first criterion comprises a threshold amplitude of the detected vertical movement, and the output corresponds to an alert when the amplitude of the detected vertical movement exceeds the threshold amplitude.

17. The method of claim 16, wherein the output indicates a frequency of the detected vertical movement, the first criterion includes a threshold frequency, and the output corresponds to the alert when the frequency of the detected vertical movement exceeds the threshold frequency.

18. The method of claim 15, comprising determining if the detected vertical movement satisfies a second criterion and wherein the output includes an indication based on the detected vertical movement satisfying the second criterion.

19. The method of claim 18, wherein the second criterion comprises a trend in the detected vertical movement over time, and the output includes an indication of a potential future need for maintenance when the detected vertical movement satisfies the second criterion.

20. The method of claim 15, wherein the at least one detector comprises a plurality of detectors, and including providing a portion one detector on the tie down mechanism and providing a portion of another detector on the at least one damper.

21. The method of claim 13, wherein the at least one damper comprises two hydraulic cylinders, the at least one detector comprises two detectors, one of the detectors is associated with each of the hydraulic cylinders, and outputs of the detectors collectively indicate a symmetry between the hydraulic cylinders.

22. The method of claim 13, wherein the at least one damper comprises a hydraulic fluid within a cylinder, and the method comprises determining whether gas is present within the cylinder based on the detected vertical movement.

23. The method of claim 22, wherein the cylinder is associated with a hydraulic circuit, the hydraulic circuit includes a reservoir and at least one conduit between the cylinder and the reservoir, and the method comprises determining whether air is present in the hydraulic circuit based on the detected vertical movement.

* * * * *